US012226912B2

(12) United States Patent
Takeuchi et al.

(10) Patent No.: US 12,226,912 B2
(45) Date of Patent: Feb. 18, 2025

(54) CONTROL METHOD FOR ROBOT

(71) Applicant: Seiko Epson Corporation, Tokyo (JP)

(72) Inventors: Kaoru Takeuchi, Azumino (JP); Hiroki Adachi, Yokohama (JP); Hirofumi Kinoshita, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 293 days.

(21) Appl. No.: 17/514,194

(22) Filed: Oct. 29, 2021

(65) Prior Publication Data
US 2022/0134565 A1    May 5, 2022

(30) Foreign Application Priority Data

Oct. 30, 2020 (JP) ................................ 2020-183021

(51) Int. Cl.
*B25J 9/16* (2006.01)

(52) U.S. Cl.
CPC .......... *B25J 9/1687* (2013.01); *B25J 9/1633* (2013.01); *B25J 9/1669* (2013.01)

(58) Field of Classification Search
CPC ...... B25J 9/1687; B25J 9/1633; B25J 9/1669; G05B 2219/40032; G05B 2219/40586; G05B 2219/37459
See application file for complete search history.

(56) References Cited

U.S. PATENT DOCUMENTS

| | | | | |
|---|---|---|---|---|
| 2002/0056181 A1* | 5/2002 | Sakakibara | ............ | B25J 9/1633 29/714 |
| 2011/0225787 A1* | 9/2011 | Sato | ........................ | B25J 9/1687 29/407.01 |
| 2013/0197696 A1* | 8/2013 | Nammoto | ............... | B25J 9/1633 700/258 |
| 2018/0071911 A1* | 3/2018 | Miyamoto | ............. | B25J 9/1687 |
| 2018/0339414 A1* | 11/2018 | Taguchi | ................. | B25J 9/1633 |

(Continued)

FOREIGN PATENT DOCUMENTS

| | | |
|---|---|---|
| CN | 110614643 A | 12/2019 |
| JP | H08-194521 A | 7/1996 |
| JP | 2019048350 A * | 3/2019 |

OTHER PUBLICATIONS

Suzuki, Yosuke; Tsuji, Tokuo; Watanabe, Tetsuyou; Nishimura, Toshirio; Peg in Hole under State Uncertainties via a Passive Wrist Joint with Push Activate Rotation Function, Nov. 2017, IEEE-RAS 17th International Conference on Humanoid Robotics, p. 1-8 (Year: 2017).*

*Primary Examiner* — Khoi H Tran
*Assistant Examiner* — Dairon Estevez
(74) *Attorney, Agent, or Firm* — Harness, Dickey & Pierce, P.L.C.

(57) ABSTRACT

There is provided a control method for a robot including a robot arm, the control method including a first step in which the robot arm grips a first target object and performs work for assembling the first target object and a second target object while changing a position or a posture of the first target object, a second step for setting, based on information concerning the position or the posture of the first target object during the work in the first step, a determination reference serving as a reference for starting the change of the position or the posture of the first target object or ending the change of the position or the posture of the first target object.

7 Claims, 11 Drawing Sheets

(56) References Cited

U.S. PATENT DOCUMENTS

2019/0381669 A1* 12/2019 Ogawara ................ B25J 9/1687
2020/0225647 A1*  7/2020 Oya ..................... G05B 19/418
2021/0197369 A1*  7/2021 Hasunuma ............. B25J 13/085

* cited by examiner

CONTROL METHOD FOR ROBOT

The present application is based on, and claims priority from JP Application Serial Number 2020-183021, filed Oct. 30, 2020, the disclosure of which is hereby incorporated by reference herein in its entirety.

BACKGROUND

1. Technical Field

The present disclosure relates to a control method for a robot.

2. Related Art

For example, as disclosed in JP-A-8-194521 (Patent Literature 1), there has been known a robot including a robot arm and a force detecting section that detects force applied to the robot arm, the robot performing predetermined work by performing force control for driving the robot arm based on a detection result of the force detecting section. In such a robot, various kinds of work are realized by setting, in performing work, positions and postures in which a moving direction, speed, and the like of a gripped workpiece changes.

However, when the work is actually repeated, it is assumed that various elements such as dimension fluctuation of the workpiece, an initial position of the workpiece, and a setting position of the workpiece fluctuate for each kind of work. In the method described in Patent Literature 1, it is likely that a time required for the work is relatively long or a load is excessively applied to the workpiece because of the influence of such fluctuation.

SUMMARY

A control method for a robot according to the present disclosure is a control method for a robot including a robot arm, the control method including: a first step in which the robot arm grips a first target object and performs work for assembling the first target object and a second target object while changing a position or a posture of the first target object; a second step for setting, based on information concerning the position or the posture of the first target object during the work in the first step, a determination reference serving as a reference for starting the change of the position or the posture of the first target object or ending the change of the position or the posture of the first target object.

DESCRIPTION OF EXEMPLARY EMBODIMENTS

Embodiment

Figure 1:
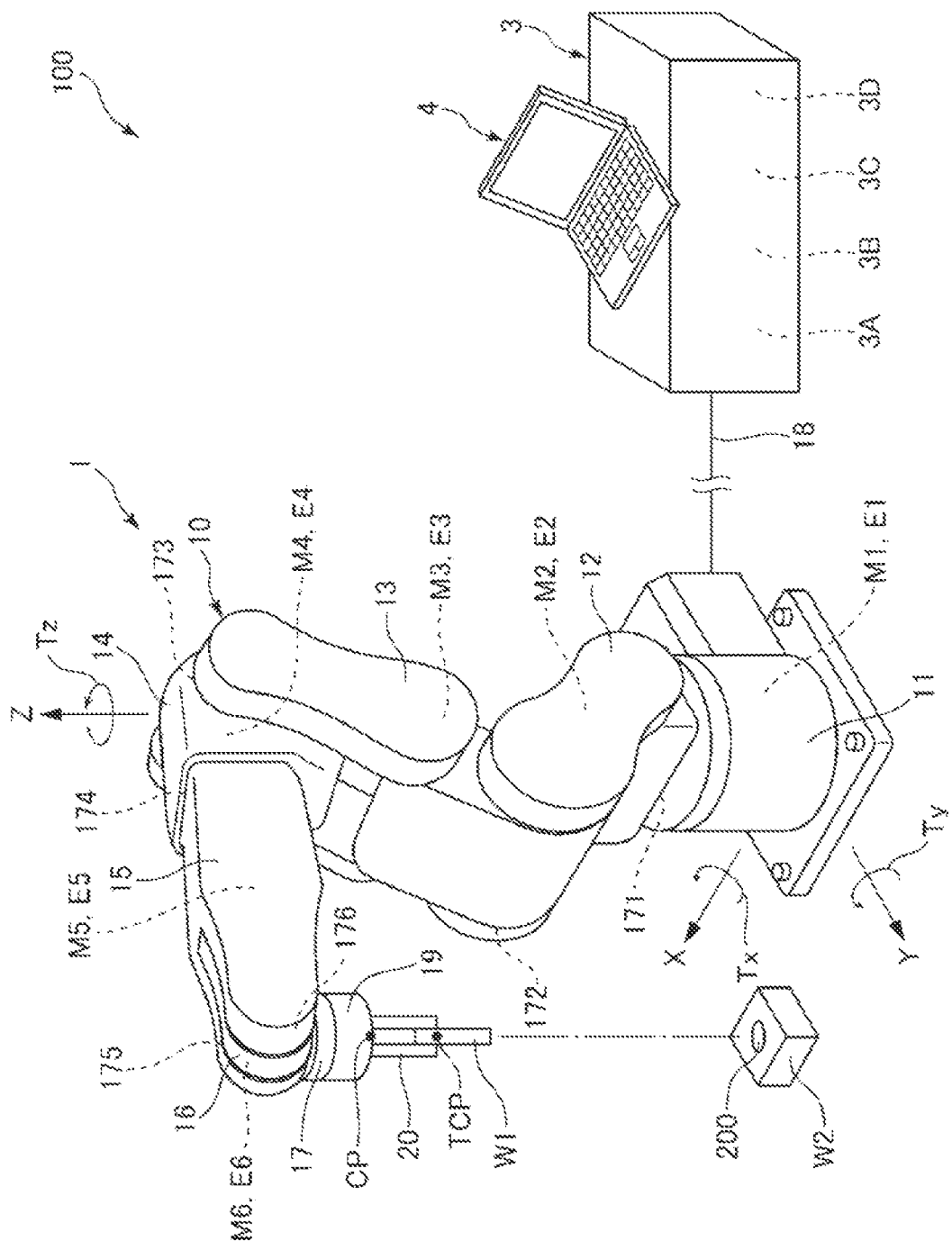
FIG. 1 is a diagram showing an overall configuration of a robot system that executes a control method for a robot according to the present disclosure.
Figure 2:
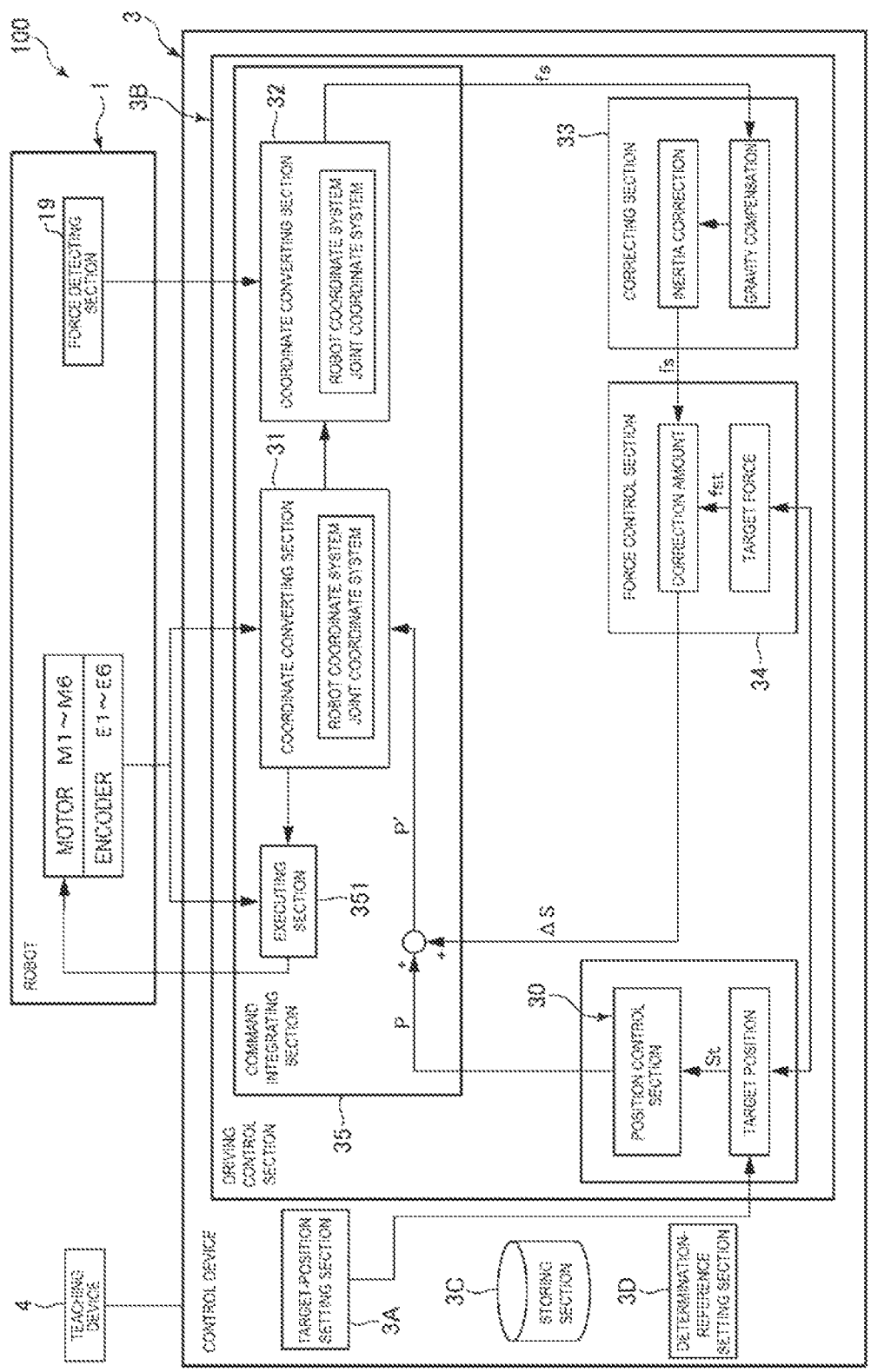
FIG. 2 is a block diagram of the robot system shown in FIG. 1.
Figure 9:
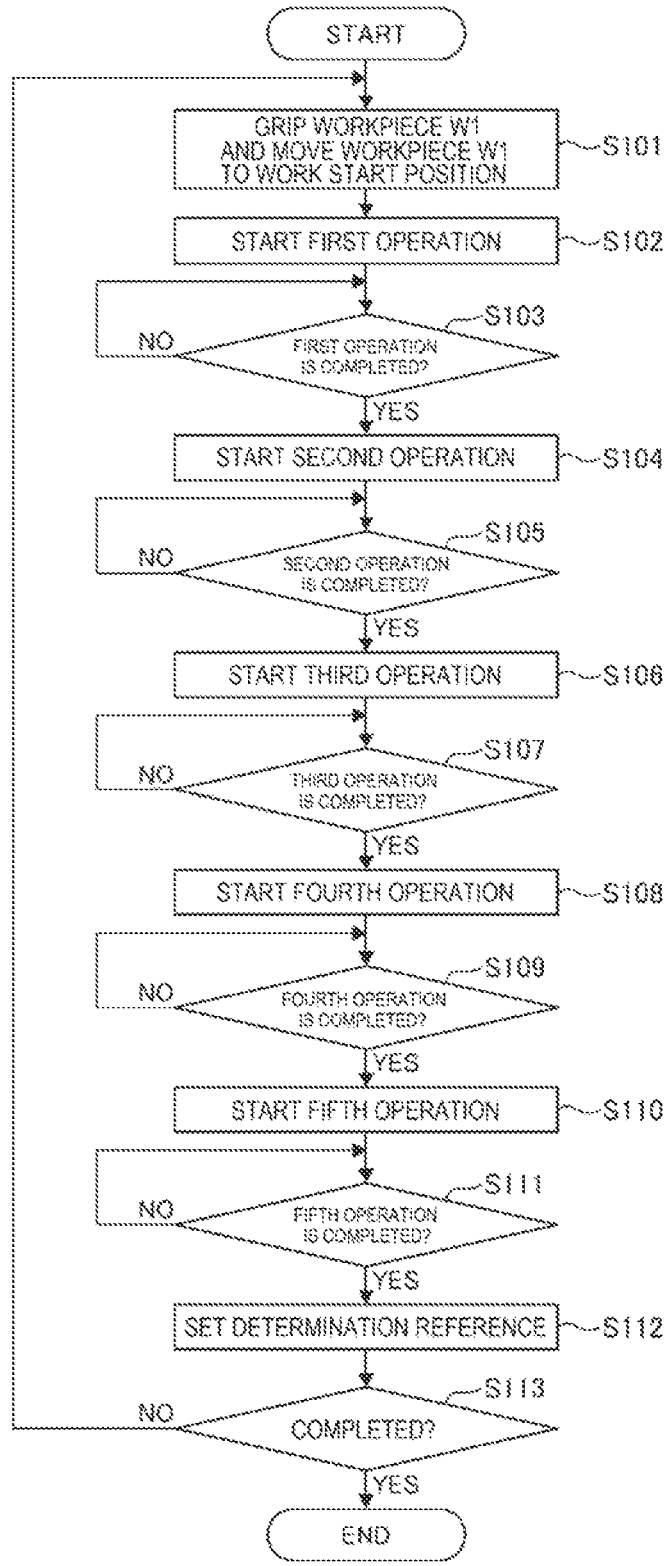
FIG. 9 is a flowchart for explaining a control operation executed by the robot system shown in FIG. 1.
Figure 10:
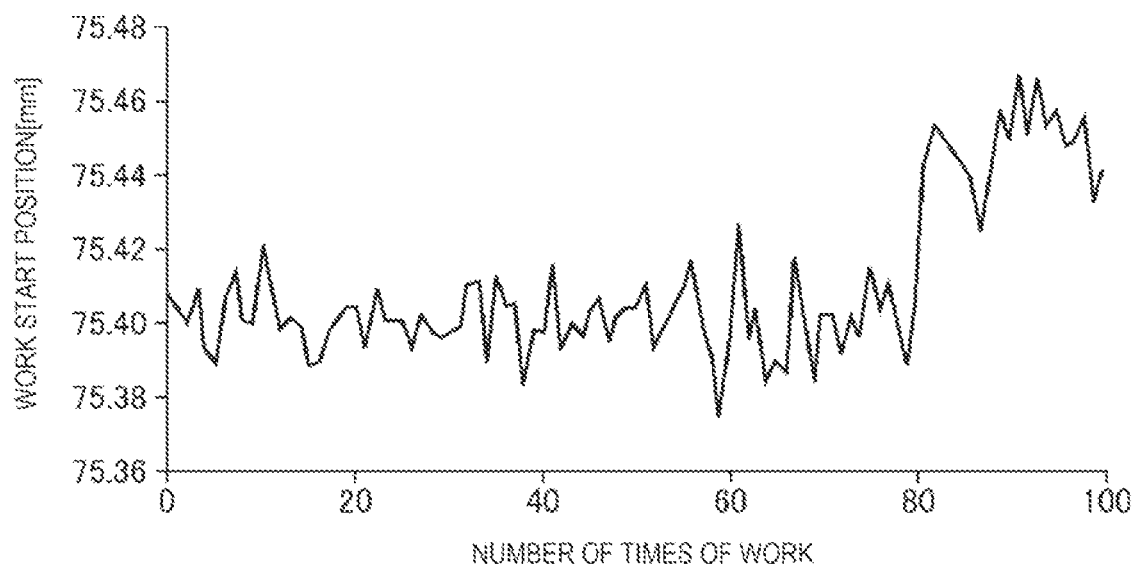
FIG. 10 is a graph displaying a work result for each number of times of work.

FIG. 1 is a diagram showing an overall configuration of a robot system that executes a control method for a robot according to the present disclosure. FIG. 2 is a block diagram of the robot system shown in FIG. 1. FIGS. 3 to 8 are sectional views for explaining, in order, an example of work executed by the robot system shown in FIG. 1. FIG. 9 is a flowchart for explaining a control operation executed by the robot system shown in FIG. 1. FIG. 10 is a graph displaying a work result for each number of times of work.

A control method for a robot is explained in detail below with reference to a preferred embodiment shown in the accompanying drawings. In the following explanation, for convenience of explanation, a +Z-axis direction, that is, an upper side in FIG. 1 is referred to as "upper" as well and a −Z-axis direction, that is, a lower side in FIG. 1 is referred to as "lower" as well. About a robot arm, a base 11 side in FIG. 1 is referred to as "proximal end" as well and the opposite side of the base 11 side, that is, an end effector side in FIG. 1 is referred to as "distal end" as well. A Z-axis direction, that is, an up-down direction in FIG. 1 is represented as a "vertical direction" and an X-axis direction and a Y-axis direction, that is, a left-right direction in FIG. 1 is represented as a "horizontal direction".

As shown in FIG. 1, a robot system 100 includes a robot 1, a control device 3 that controls the robot 1, and a teaching device 4 and executes the control method for the robot according to the present disclosure.

First, the robot 1 is explained.

The robot 1 shown in FIG. 1 is a single-arm six-axis vertical articulated robot in this embodiment and includes a base 11 and a robot arm 10. An end effector 20 can be attached to the distal end portion of the robot arm 10. The end effector 20 may be a constituent element of the robot 1 or may not be a constituent element of the robot 1.

The robot 1 is not limited to the configuration shown in FIG. 1 and may be, for example, a double-arm articulated robot. The robot 1 may be a horizontal articulated robot.

The base 11 is a supporting body that supports the robot arm 10 from the lower side to be capable of driving the robot arm 10. The base 11 is fixed to, for example, a floor in a factory. In the robot 1, the base 11 is electrically coupled to the control device 3 via a relay cable 18. The coupling of the robot 1 and the control device 3 is not limited to the coupling by wire in the configuration shown in FIG. 1 and may be, for example, coupling by radio. Further, the robot 1 and the control device 3 may be coupled via a network such as the Internet.

In this embodiment, the robot arm 10 includes a first arm 12, a second arm 13, a third arm 14, a fourth arm 15, a fifth arm 16, and a sixth arm 17. These arms are coupled in this order from the base 11 side. The number of arms included in the robot arm 10 is not limited to six and may be, for example, one, two, three, four, five, or seven or more. The sizes such as total lengths of the arms each are not particularly limited and can be set as appropriate.

The base 11 and the first arm 12 are coupled via a joint 171. The first arm 12 has a first turning axis parallel to the vertical direction as a turning center and is capable of turning with respect to the base 11 around the first turning axis. The first turning axis coincides with the normal of the floor to which the base 11 is fixed.

The first arm 12 and the second arm 13 are coupled via a joint 172. The second arm 13 is capable of turning with respect to the first arm 12 with a second turning axis parallel to the horizontal direction set as a turning center. The second turning axis is parallel to an axis orthogonal to the first turning axis.

The second arm 13 and the third arm 14 are coupled via a joint 173. The third arm 14 is capable of turning with respect to the second arm 13 with a third turning axis parallel to the horizontal direction set as a turning center. The third turning axis is parallel to the second turning axis.

The third arm 14 and the fourth arm 15 are coupled via a joint 174. The fourth arm 15 is capable of turning with respect to the third arm 14 with a fourth turning axis parallel to a center axis direction of the third arm 14 set as a turning center. The fourth turning axis is orthogonal to the third turning axis.

The fourth arm 15 and the fifth arm 16 are coupled via a joint 175. The fifth arm 16 is capable of turning with respect to the fourth arm 15 with a fifth turning axis set as a turning center. The fifth turning axis is orthogonal to the fourth turning axis.

The fifth arm 16 and the sixth arm 17 are coupled via a joint 176. The sixth arm 17 is capable of turning with respect to the fifth arm 16 with a sixth turning axis set as a turning center. The sixth turning axis is orthogonal to the fifth turning axis.

The sixth arm 17 is a robot distal end portion located on the most distal end side in the robot arm 10. The sixth arm 17 can turn together with the end effector 20 according to driving of the robot arm 10.

The robot 1 includes a motor M1, a motor M2, a motor M3, a motor M4, a motor M5, and a motor M6 functioning as driving sections and an encoder E1, an encoder E2, an encoder E3, an encoder E4, an encoder E5, and an encoder E6. The motor M1 is incorporated in the joint 171 and relatively rotates the base 11 and the first arm 12. The motor M2 is incorporated in the joint 172 and relatively rotates the first arm 12 and the second arm 13. The motor M3 is incorporated in the joint 173 and relatively rotates the second arm 13 and the third arm 14. The motor M4 is incorporated in the joint 174 and relatively rotates the third arm 14 and the fourth arm 15. The motor M5 is incorporated in the joint 175 and relatively rotates the fourth arm 15 and the fifth arm 16. The motor M6 is incorporated in the joint 176 and relatively rotates the fifth arm 16 and the sixth arm 17.

The encoder E1 is incorporated in the joint 171 and detects the position of the motor M1. The encoder E2 is incorporated in the joint 172 and detects the position of the motor M2. The encoder E3 is incorporated in the joint 173 and detects the position of the motor M3. The encoder E4 is incorporated in the joint 174 and detects the position of the motor M4. The encoder E5 is incorporated in the joint 175 and detects the position of the motor M5. The encoder E6 is incorporate in the joint 176 and detects the position of the motor M6.

The encoders E1 to E6 are electrically coupled to the control device 3. Position information, that is, rotation amounts of the motors M1 to M6 are transmitted to the control device 3 as electric signals. The control device 3 drives the motors M1 to M6 via a not-shown motor driver based on the information. That is, controlling the robot arm 10 means controlling the motors M1 to M6.

A control point CP is set at the distal end of the robot arm 10. The control point CP means a point serving as a reference in performing control of the robot arm 10. The robot system 100 grasps the position of the control point CP in a robot coordinate system and drives the robot arm 10 such that the control point CP moves to a desired position.

In the robot 1, a force detecting section 19 that detects force is detachably set in the robot arm 10. The robot arm 10 can be driven in a state in which the force detecting section 19 is set in the robot arm 10. In this embodiment, the force detecting section 19 is a six-axis force sensor. The force detecting section 19 detects the magnitudes of forces on three detection axes orthogonal to one another and the magnitudes of torques around the three detection axes. That is, the force detecting section 19 detects force components in axial directions of an X axis, a Y axis, and a Z axis orthogonal to one another, a force component in a Tx direction, which is a direction around the X axis, a force component in a Ty direction, which is a direction around the Y axis, and a force component in a Tz direction, which is a direction around the Z axis. In this embodiment, the Z-axis direction is the vertical direction. The force components in the axial directions can be referred to as "translational force components" as well and the force components around the axes can be referred to as "rotational force components" as well. The force detecting section 19 is not limited to the six-axis force sensor and may be a sensor having another configuration.

In this embodiment, the force detecting section 19 is set in the sixth arm 17. A setting place of the force detecting section 19 is not limited to the sixth arm 17, that is, the arm located on the most distal end side. The force detecting section 19 may be set in another arm or between the arms adjacent to each other or may be set below the base 11. A plurality of force detecting sections 19 may be respectively set in all the joints.

The end effector 20 can be detachably attached to the force detecting section 19. The end effector 20 is configured by a hand, a pair of claws of which approaches and separates to thereby grip and release an object. However, in the present disclosure, the end effector 20 is not limited to this and may include two or more claws. The end effector 20 may be a hand that grips an object with attraction.

In the robot coordinate system, a tool center point TCP is set in any position at the distal end of the end effector 20, preferably, at the distal end in a state in which the claws approach. As explained above, the robot system 100 grasps the position of the control point CP in the robot coordinate system and drives the robot arm 10 such that the control point CP moves to a desired position. By grasping a type, in particular, the length of the end effector 20, it is possible to grasp an offset amount between the tool center point TCP and the control point CP. Accordingly, the position of the tool center point TCP can be grasped in the robot coordinate system. Therefore, the tool center point TCP can be set as a reference of control.

A workpiece W1 is a bar-like body, a cross sectional shape of which is formed in a circular shape. The cross sectional shape of the workpiece W1 may be a triangle, a quadrangle, or other polygons. The workpiece W1 may be a connector of an electronic device, a plastic exterior component, or the like. In this embodiment, a workpiece W2 is formed in a block shape in which an insertion hole 200, into which the workpiece W1 is inserted, is provided.

The control device 3 and the teaching device 4 are explained.

The control device 3 is disposed to be separated from the robot 1 and can be configured by a computer or the like incorporating a CPU (Central Processing Unit), which is an example of a processor. The control device 3 may be incorporated in the base 11 of the robot 1.

The control device 3 is communicably coupled to the robot 1 by the relay cable 18. The control device 3 is wirelessly communicably coupled to the teaching device 4 by a cable. The teaching device 4 may be a dedicated computer or may be a general-purpose computer installed with a program for teaching the robot 1. For example, a teaching pendant or the like, which is a dedicated device for teaching the robot 1, may be used instead of the teaching device 4. Further, the control device 3 and the teaching device 4 may include separate housings or may be integrally configured.

The teaching device 4 may be installed with a program for generating an execution program having a target position and posture $S_t$ and a target force $f_{St}$ explained below as arguments and loading the execution program to the control device 3. The teaching device 4 includes a display, a processor, a RAM, and a ROM. These hardware resources cooperate with a teaching program to generate the execution program.

As shown in FIG. 2, the control device 3 is a computer installed with a control program for performing control of the robot 1. The control device 3 includes a processor and a RAM and a ROM not shown in FIG. 3. These hardware resources cooperate with a program to thereby control the robot 1.

As shown in FIG. 2, the control device 3 includes a target-position setting section 3A, a driving control section 3B, a storing section 3C, and a determination-reference setting section 3D. The storing section 3C is configured by, for example, a volatile memory such as a RAM (Random Access Memory), a nonvolatile memory such as a ROM (Read Only Memory), and a detachable external storage device. An operation program for causing the robot 1 to operate such as a program for executing the control method for the robot according to the present disclosure is stored in the storing section 3C.

The target-position setting section 3A sets the target position and posture $S_t$ and an operation route for executing predetermined work on the workpiece W1. The target-position setting section 3A sets the target position and posture $S_t$ and the operation route based on teaching information and the like input from the teaching device 4.

The driving control section 3B controls driving of the robot arm 10 and includes a position control section 30, a coordinate converting section 31, a coordinate converting section 32, a correcting section 33, a force control section 34, and a command integrating section 35.

The position control section 30 generates, according to a target position designated by a command created in advance, a position command signal, that is, a position command value for controlling the position of the tool center point TCP of the robot 1.

The control device 3 is capable of controlling the operation of the robot 1 with force control or the like. The "force control" means control of the operation of the robot 1 for changing, based on a detection result of the force detecting section 19, the position of the end effector 20, that is, the position of the tool center point TCP and the postures of the first to sixth arms 12 to 17.

The force control includes, for example, force trigger control and impedance control. In the force trigger control, the control device 3 performs force detection with the force detecting section 19. The control device 3 causes the robot arm 10 to perform operations of movement and a change in a posture until predetermined force is detected by the force detecting section 19.

The impedance control includes tracer control. In the impedance control, the control device 3 controls the operation of the robot arm 10 to maintain force applied to the distal end portion of the robot arm 10 at predetermined force as much as possible, that is, maintain a force in a predetermined direction detected by the force detecting section 19 at the target force $f_{St}$ as much as possible. Consequently, for example, when the impedance control is performed on the robot arm 10, the robot arm 10 performs an operation for tracing, in the predetermined direction, a target object or an external force applied from an operator. The target force $f_{St}$ includes 0 as well. For example, as one kind of setting in the case of the tracing operation, a target value can be set to "0". The target force $f_{St}$ can be set to a numerical value other than 0. The operator can set the target force $f_{St}$ as appropriate.

The storing section 3C stores a correspondence relation between a combination of rotation angles of the motors M1 to M6 and the position of the tool center point TCP in the robot coordinate system. The control device 3 stores, in the storing section 3C, based on a command, at least one of the target position and posture $S_t$ and the target force $f_{St}$ for each of processes of work performed by the robot 1. A command having the target position and posture $S_t$ and the target force $f_{St}$ as arguments, that is, parameters is set for each of the processes of the work performed by the robot 1.

The driving control section 3B controls the first to sixth arms 12 to 17 such that the set target position and posture $S_t$ and the set target force $f_{St}$ coincide at the tool center point TCP. The target force $f_{St}$ is a detected force and detected torque of the force detecting section 19 that should be achieved by the operations of the first to sixth arms 12 to 17. The character "S" represents any one direction of the directions of the axes (X, Y, and Z) defining the robot coordinate system. S also represents a position in an S direction. For example, when S=X, an X-direction component of a target position set in the robot coordinate system is $S_t=X_t$ and an X-direction component of a target force is $f_{St}=f_{Xt}$.

In the driving control section 3B, when rotation angles of the motors M1 to M6 are acquired, the coordinate converting section 31 shown in FIG. 2 converts, based on the correspondence relation, the rotation angles into a position and posture S of the tool center point TCP in the robot coordinate system. The coordinate converting section 32 specifies, based on the position and posture S of the tool center point TCP and a detection value of the force detecting section 19, in the robot coordinate system, an acting force $f_S$ actually acting on the force detecting section 19.

An acting point of the acting force $f_S$ is defined as a force detection origin separately from the tool center point TCP. The force detection origin corresponds to a point where the force detecting section 19 is detecting force. The control device 3 stores, for each of positions and postures S of the tool center point TCP in the robot coordinate system, a correspondence relation specifying directions of detection axes in a sensor coordinate system of the force detecting section 19. Therefore, the control device 3 can specify the acting force $f_S$ in the robot coordinate system based on the position and posture S of the tool center point TCP in the robot coordinate system and the correspondence relation. Torque acting on the robot 1 can be calculated from the acting force $f_S$ and the distance from a contact point to the force detecting section 19 and is specified as a rotational force component. When the end effector 20 comes into contact with the workpiece W1 and performs work, the contact point can be regarded as the tool center point TCP.

The correcting section 33 performs gravity compensation on the acting force $f_S$. The gravity compensation means removing components of force and torque due to the gravity from the acting force $f_S$. The acting force $f_S$ subjected to the gravity compensation can be regarded as force other than the gravity acting on the robot arm 10 or the end effector 20.

The correcting section 33 performs inertia compensation on the acting force $f_S$. The inertia compensation means removing components of force and torque due to an inertial force from the acting force $f_S$. The acting force $f_S$ subjected to the inertia compensation can be regarded as force other than the inertial force acting on the robot arm 10 or the end effector 20.

The force control section 34 performs impedance control. The impedance control is active impedance control for realizing virtual mechanical impedance with the motors M1 to M6. The control device 3 executes such impedance control when performing processes in a contact state in which the end effector 20 receives force from a target object such as fitting work, screwing work, and polishing work and direct teaching. In processes other than such processes, safety can be improved by performing, for example, the impedance control when a human touches the robot 1.

In the impedance control, the force control section 34 substitutes the target force $f_{St}$ in an equation of motion explained blow to derive rotation angles of the motors M1 to M6. A signal with which the control device 3 controls the motors M1 to M6 is a PWM (Pulse Width Modulation)-modulated signal.

In a process in a noncontact state in which the end effector 20 does not receive an external force, the control device 3 controls the motors M1 to M6 with rotation angles derived from the target position and posture $S_t$ by a linear operation. A mode for controlling the motors M1 to M6 at the rotation angles derived from the target position and posture $S_t$ by the linear operation is referred to as a position control mode.

The control device 3 specifies a force-derived correction amount ΔS by substituting the target force $f_{St}$ and the acting force $f_S$ in an equation of motion of the impedance control. The force-derived correction amount ΔS means the magnitude of the position and posture S to which the tool center point TCP should move in order to cancel a force deviation $\Delta f_S(t)$ from the target force $f_{St}$ when the tool center point TCP receives mechanical impedance. Expression (1) described below is the equation of motion of the impedance control.

$$m\Delta\ddot{S}(t)+d\Delta\dot{S}(t)+k\Delta S(t)=\Delta f_S(t) \quad (1)$$

The left side of Expression (1) is formed by a first term obtained by multiplying a second order differential value of the position and posture S of the tool center point TCP by a virtual mass coefficient m (hereinafter referred to as "mass coefficient m"), a second term obtained by multiplying a differential value of the position and posture S of the tool center point TCP by a virtual coefficient of viscosity d (hereinafter referred to as "coefficient of viscosity d"), and a third term obtained by multiplying the position and posture S of the tool center point TCP by a virtual modulus of elasticity k (hereinafter referred to as "modulus of elasticity k"). The right side of Expression (1) is formed by a force deviation $\Delta f_S(t)$ obtained by subtracting actual force f from the target force $f_{St}$. Differential in Expression (1) means differential by time. In a process performed by the robot 1, in some case, a fixed value is set as the target force $f_{St}$ or a function of time is set as the target force $f_{St}$.

The mass coefficient m means mass that the tool center point TCP virtually has. The coefficient of viscosity d means viscosity resistance that the tool center point TCP virtually receives. The modulus of elasticity k means a spring constant of an elastic force that the tool center point TCP virtually receives.

As a value of the mass coefficient m increases, the acceleration of a motion decreases. As the value of the mass coefficient m decreases, the acceleration of the motion increases. As a value of the coefficient of viscosity d increases, the speed of the motion decreases. As the value of the coefficient of viscosity d decreases, the speed of the operation increases. As a value of the modulus of elasticity k increases, a spring property increases. As the value of the modulus of elasticity k decreases, the spring property decreases.

The mass coefficient m, the coefficient of viscosity d, and the modulus of elasticity k may be set to different values for each of directions or may be set to common values irrespective of directions. The operator can set the mass coefficient m, the coefficient of viscosity d, and the modulus of elasticity k as appropriate before work.

The mass coefficient m, the coefficient of viscosity d, and the modulus of elasticity k are force control parameters. The force control parameters are values set before the robot arm 10 actually performs work. The force control parameters include the mass coefficient m, the coefficient of viscosity d, the modulus of elasticity k, and a target force.

In this way, the robot system 100 calculates, during execution of the force control, a correction amount from a detection value of the force detecting section 19, preset force control parameters, and a preset target force. The correction amount means the force-derived correction amount ΔS explained above and means a difference from a position to which the tool center point TCP should be move from a position where an external force is received.

The command integrating section 35 adds the force-derived correction amount ΔS to the position command value P generated by the position control section 30. By performing the addition at any time, the command integrating section 35 calculates a new position command value P' from the position command value P used to move the tool center point TCP to the position where the external force is received.

The coordinate converting section 31 converts the new position command value P' into a robot coordinate and an executing section 351 executes the new position command value P'. Consequently, it is possible to move the tool center point TCP to a position obtained by taking into account the force-derived correction amount ΔS, respond to the external force, and prevent a more load from being applied to a target object that comes into contact with the robot 1.

With such a driving control section 3B, in a state in which the robot arm 10 grips the workpiece W1, it is possible to drive the robot arm 10 such that the tool center point TCP moves until the target force $f_{St}$ reaches a preset value while moving the tool center point TCP toward the target position and posture $S_t$. Specifically, it is possible to perform insertion work until the workpiece W1 is inserted into the insertion hole 200 of the workpiece W2 and the preset target force $f_{St}$ is detected and complete the insertion work. By performing the force control explained above in an insertion process, it is possible to prevent or suppress a load from being excessively applied to the workpiece W1 and the workpiece W2.

As explained below, the determination-reference setting section 3D shown in FIG. 2 sets a determination reference serving as a reference for starting a change of the position or the posture of the workpiece W1 during work or ending the change of the position or the posture of the workpiece W1. This is explained below. First, an example of the work is explained. In the following explanation, insertion work for inserting the workpiece W1 into the insertion hole 200 of the workpiece W2 is explained as an example of the work. The work is not limited to the insertion work. The control method for the robot according to the present disclosure is also applicable to other assembly work, for example, work such as screwing.

In the work explained below, as shown in FIGS. 3 to 8, the position of the workpiece W1 is grasped as a position in a robot coordinate system of a control point CP' set in a midpoint of a distal end face, that is, a lower end face of the workpiece W1 and the posture of the workpiece W1 is grasped as an inclination angle of a center axis O1 passing the control point CP'. Since it is known which position of the workpiece W1 is gripped, it is possible to grasp the position in the robot coordinate system of the control point CP' by grasping an offset amount from the tool center point TCP. It is possible to calculate an angle of the center axis O1 from joint angles of the robot arm 10.

The robot 1 performs work for gripping the workpiece W1, inserting the workpiece W1 into the workpiece W2, and fitting the workpiece W1 and the workpiece W2. The "fitting" is not limited to fitting in a narrow sense and is used in a broad concept including fit-in and engagement. Therefore, depending on the configurations of the workpiece W1 and the workpiece W2, the "fitting" can read "fit-in", "engagement", and the like. The work may be work for gripping the workpiece W2 and inserting the workpiece W1 into the workpiece W2.

Figure 3:
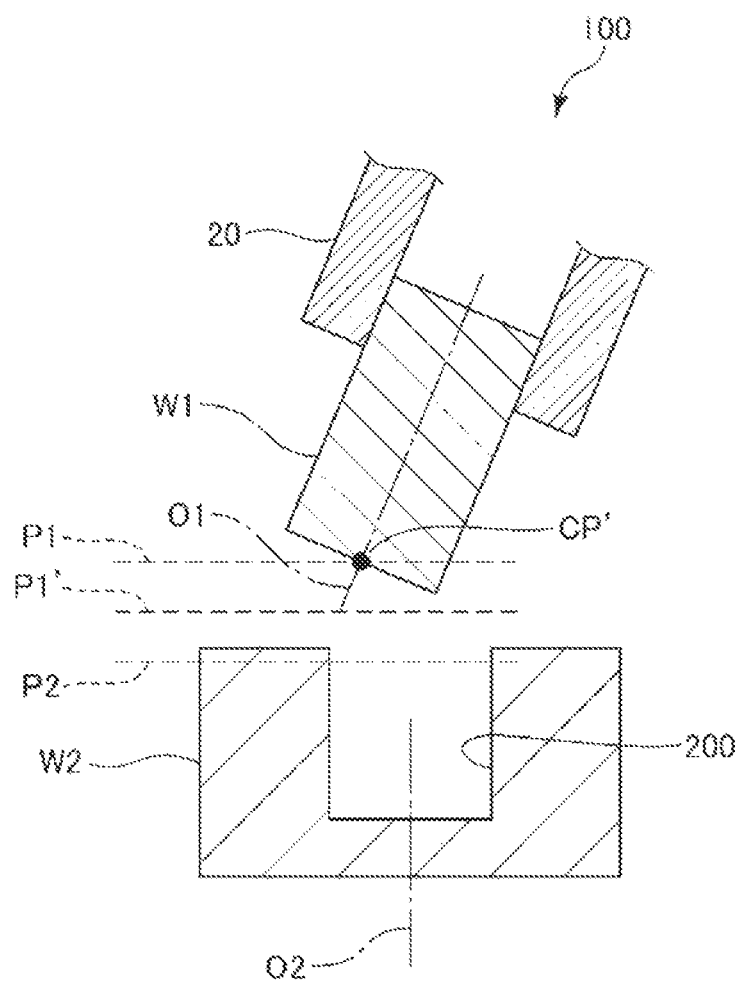
FIG. 3 is a sectional view for explaining, in order, an example of work executed by the robot system shown in FIG. 1.
Figure 4:
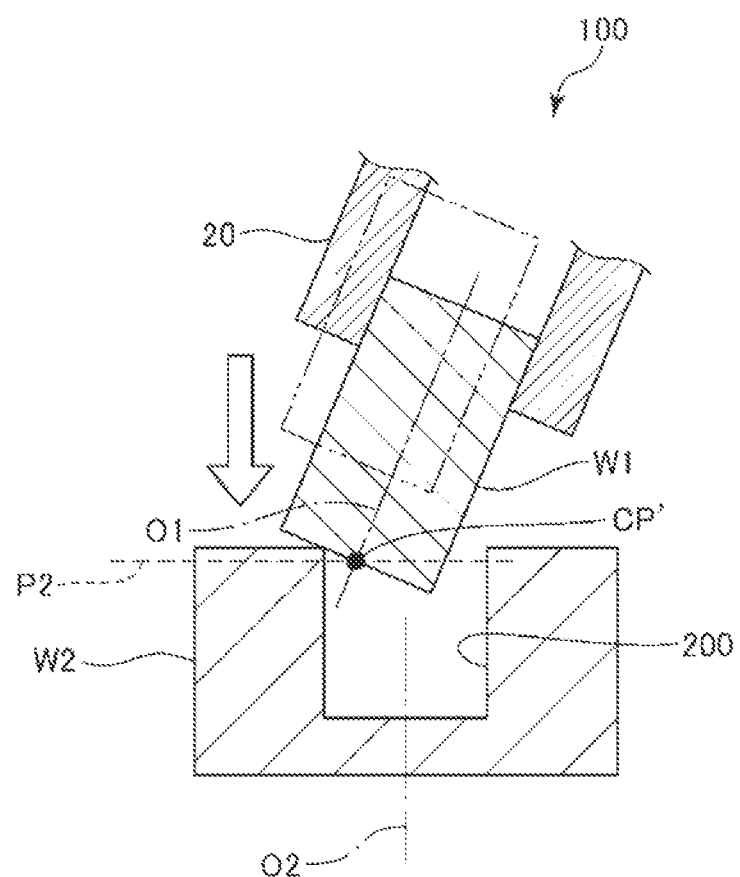
FIG. 4 is a sectional view for explaining, in order, the example of the work executed by the robot system shown in FIG. 1.
Figure 5:
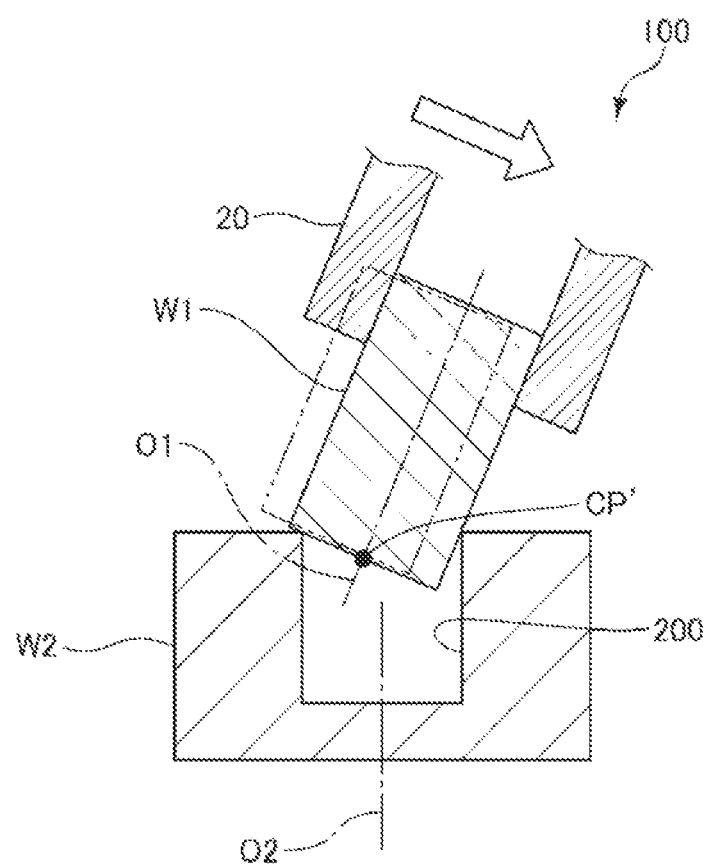
FIG. 5 is a sectional view for explaining, in order, the example of the work executed by the robot system shown in FIG. 1.
Figure 6:
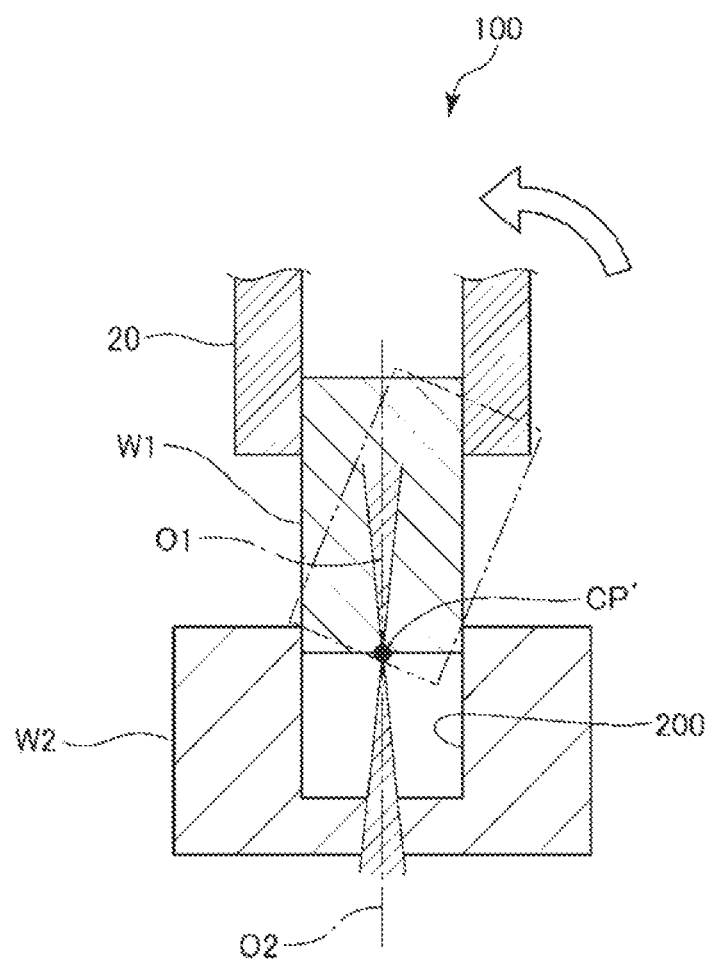
FIG. 6 is a sectional view for explaining, in order, the example of the work executed by the robot system shown in FIG. 1.
Figure 7:
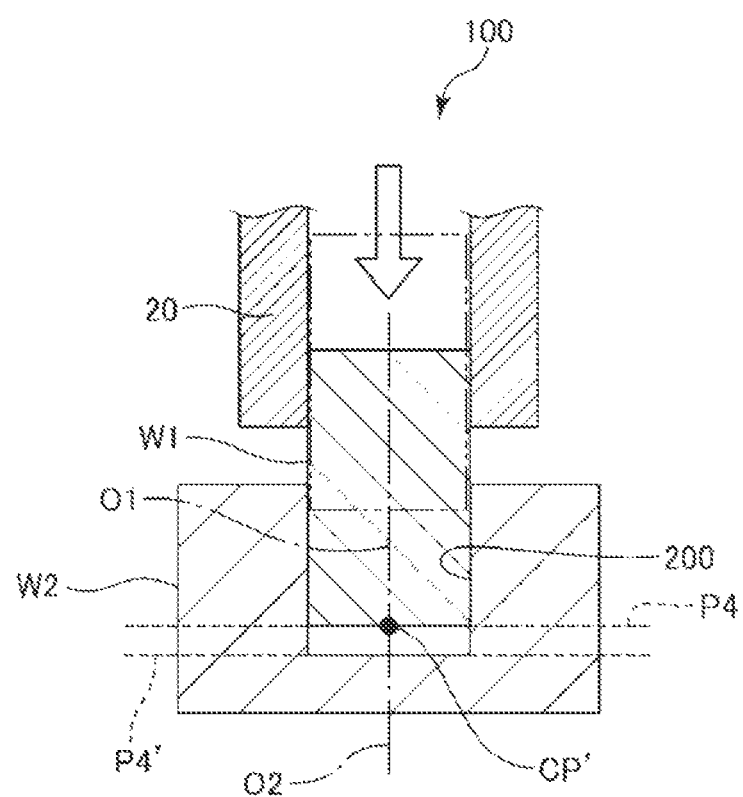
FIG. 7 is a sectional view for explaining, in order, the example of the work executed by the robot system shown in FIG. 1.
Figure 8:
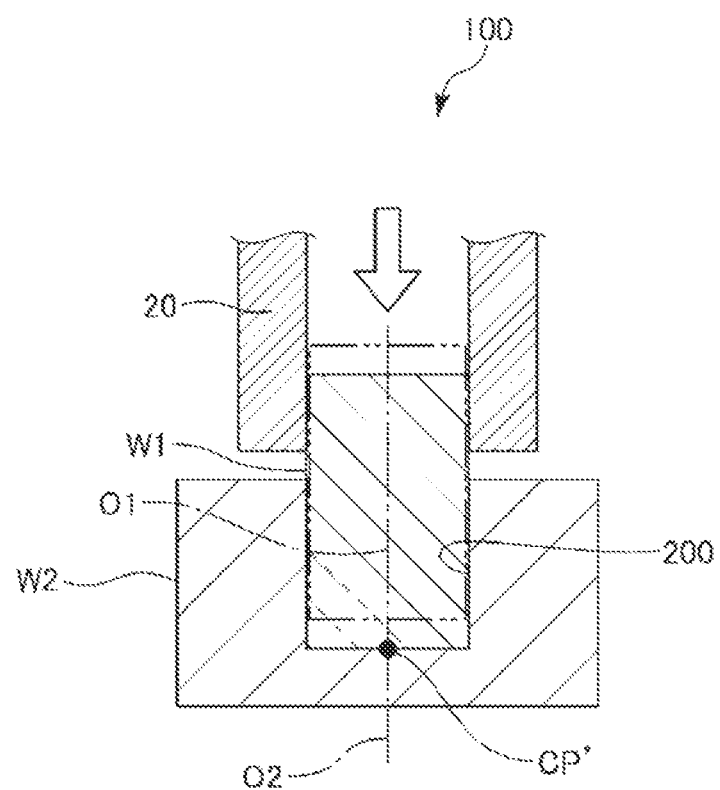
FIG. 8 is a sectional view for explaining, in order, the example of the work executed by the robot system shown in FIG. 1.

The insertion work includes a first operation shown in FIGS. 3 and 4, a second operation shown in FIG. 5, a third operation shown in FIG. 6, a fourth operation shown in FIG. 7, and a fifth operation shown in FIG. 8. These operations are performed in order. Before these operations are performed, the end effector 20 grips a predetermined position of the workpiece W1 and disposes the workpiece W2 in a predetermined position on the horizontal plane. A center axis O2 of the insertion hole 200 of the workpiece W2 is along the vertical direction. As shown in FIG. 3, the workpiece W1 is located in a work start position P1.

The first operation is an operation for lowering the workpiece W1 from the work start position P1 shown in FIG. 3 until the workpiece W1 comes into contact with the workpiece W2 as shown in FIG. 4. The first operation is performed by the force control. The posture of the workpiece W1 in the work start position P1 is in a state in which the center axis O1 is inclined a predetermined angle with respect to the vertical direction. In a state in which the workpiece W1 is located in the work start position P1, the control point CP' is separated a predetermined distance from the workpiece W2. The control point CP' is located on one side, in the configuration shown in the figures, the left side from the center axis O2.

When the workpiece W1 is moved vertically downward from this state as indicated by an arrow in FIG. 4, the lower end face of the workpiece W1 comes into contact with a portion further on the left side than the center axis O2 in an edge portion of the insertion hole 200 of the workpiece W2.

The second operation is an operation for moving the workpiece W1 to the center axis O2 side of the insertion hole 200 while maintaining the inclined state as shown in FIG. 5. A start position and posture of the second operation is an end position and posture of the first operation. The second operation is performed by the force control. Specifically, the second operation is performed until the workpiece W1 comes into contact with a portion further on the right side than the center axis O2 in the edge portion of the insertion hole 200 of the workpiece W2.

The third operation is an operation for changing the inclination angle of the workpiece W1 and canceling the inclination of the workpiece W1 as shown in FIG. 6. Specifically, the third operation is an operation for rotating the workpiece W1 such that the center axis O1 of the workpiece W1 coincides with the center axis O2 of the insertion hole 200. A start position and posture of the third operation is an end position and posture of the second operation. The third operation may be performed by the force control, may be performed by position control, or may be performed by the force control and the position control. When such a third operation is performed, it is possible to bring the workpiece W1 into an insertion start position and posture.

The fourth operation and the fifth operation are operations for inserting the workpiece W1 into the insertion hole 200 until the insertion is completed as shown in FIGS. 7 and 8.

The fourth operation is an operation for inserting the workpiece W1 until immediately before the insertion completion with the force control or the position control. A start position and posture of the fourth operation is an end position and posture of the third operation.

The fifth operation is operation for inserting, with the force control, the workpiece W1 until the insertion completion, that is, until the workpiece W1 comes into contact with the bottom of the insertion hole 200. A start position and posture of the fifth operation is an end position and posture of the fourth operation.

By repeating such work in a plurality of works W1 and W2, it is possible to produce a plurality of assembled bodies assembled by inserting the workpiece W1 into the workpiece W2.

When the work explained above is repeated, it is assumed that various elements such as dimension fluctuation of the workpiece W1 and the workpiece W2, initial positions and postures of the workpiece W1 and the workpiece W2, and the workpiece W1 and the workpiece W2 fluctuate for each kind of work. Therefore, a position and posture of the workpiece W1 in switching the operations in work performed for the first time is not always appropriate in the next and subsequent work. Accordingly, it is likely that a time required for the work is relatively long because of influence of the fluctuation and a load is excessively applied to a workpiece.

Therefore, in the present disclosure, the problem described above is solved by performing control explained below. This is explained below with reference to a flowchart of FIG. 9.

First, the robot 1 starts work for the first time. The work for the first time may be an experimental work or may be a normal production work. Specifically, in step S101, the robot 1 grips the workpiece W1 and moves the workpiece W1 to the work start position P1 (see FIG. 3). In step S102, the robot 1 starts the first operation. That is, the robot 1 moves the workpiece W1 in an arrow direction in FIG. 4. Subsequently, in step S103, the robot 1 determines whether the first operation is completed. This determination is performed based on whether a value of force received by the robot arm 10 has reached a predetermined value. The robot 1 performs the first operation until determining in step S103 that the work for the first time is completed.

Subsequently, in step S104, the robot 1 starts the second operation. That is, the robot 1 switches the first operation to the second operation. Specifically, the robot 1 moves the workpiece W1 in an arrow direction in FIG. 5. Subsequently, in step S105, the robot 1 determines whether the second operation is completed. This determination is performed based on whether a value of force in a predetermined direction received by the robot arm 10 has reached a predetermined value. The robot 1 performs the second operation until determining in step S105 that the second operation is completed.

Subsequently, in step S106, the robot 1 starts the third operation. That is, the robot 1 switches the second operation to the third operation. Specifically, the robot 1 moves the workpiece W1 in an arrow direction in FIG. 6. That is, the robot 1 changes a posture. Subsequently, in step S107, the robot 1 determines whether the third operation is completed. This determination is performed based on whether the posture of the robot arm 10 changes to a preset posture. The robot 1 performs the third operation until determining in step S107 that the third operation is completed.

Subsequently, in step S108, the robot 1 starts the fourth operation. That is, the robot 1 switches the third operation to the fourth operation. Specifically, the robot 1 moves the workpiece W1 in an arrow direction in FIG. 7. Subsequently, in step S109, the robot 1 determines whether the fourth operation is completed. This determination is performed based on whether the control point CP' has moved to a preset position. The robot 1 performs the fourth operation until determining in step S109 that the fourth operation is completed.

Subsequently, in step S110, the robot 1 starts the fifth operation. That is, the robot 1 switches the fourth operation to the fifth operation. Specifically, the robot 1 moves the workpiece W1 in an arrow direction in FIG. 8. Subsequently, in step S111, the robot 1 determines whether the fifth operation is completed. This determination is performed based on whether the workpiece W1 has come into contact with the bottom of the insertion hole 200, that is, whether force applied to the robot arm 10 has reached a predetermined value. The robot 1 performs the fifth operation until determining in step S111 that the fifth operation is completed.

Steps S102 to S111 explained above are the first step.

Work results of the first to fifth operations, that is, positions and postures of the workpiece W1 at the time when the operations are switched are stored in the storing section 3C for each of the steps. A storage destination is not limited to the storing section 3C and may be a storing section of the teaching device 4 or another storage device coupled via a network.

Subsequently, in step S112, the robot 1 sets, based on information concerning the position and posture of the workpiece W1 during the work in steps S102 to S111, a determination reference serving as a reference for starting a change of the position and posture of the workpiece W1 or ending the change of the position and posture of the workpiece W1. The determination reference is used as a reference of a position and posture for switching the operations when steps S102 to S111 for the second and subsequent times are executed.

The determination reference includes a first determination reference, a third determination reference, and a fourth determination reference.

The first determination reference is a reference concerning a start position of the first operation in work in the second and subsequent times. The first determination reference is set based on a position P2 of the workpiece W1 at an end time of the first operation for the first time. Specifically, the robot 1 stores the position of the control point CP' shown in FIG. 4 and sets the work start position P1' where a moving distance is smaller than a moving distance from a start position of the first operation for the first time to an end position of the first operation for the first time. That is, the robot 1 sets any position between the work start position P1 of the first operation for the first time and the end position of the first operation for the first time as the first determination reference. When the robot 1 starts the first operation for the second time, in moving the control point CP' to the work start position P1', the robot 1 determines based on the first determination reference whether the movement is completed.

By setting such a first determination reference and starting the first operation based on the setting, it is possible to further reduce a moving distance of the first operation for the second time. Accordingly, it is possible to achieve a reduction in a work time.

In this way, the determination reference includes the first determination reference concerning the start position of the first operation. Consequently, in the first operation for the next and subsequent times, it is possible to set start positions in more proper positions.

The first determination reference is set based on the position of the workpiece W1, which is the first target object, at the end time of the first operation in the work for the first time, which is the first step. Consequently, it is possible to perform work for the second time taking into account a work result for the first time. It is possible to bring a start position of the first operation for the second time close to a work end position for the first time. Accordingly, it is possible to achieve a reduction in a work time.

In the above explanation, the robot 1 replaces the work start position P1 with the work start position P1'. However, in the present disclosure, the robot 1 is not limited to this. In the work for the second time, the robot 1 may move to the work start position P1 once at a high speed and, thereafter, move the workpiece W1 to the work start position P1 with low-speed position control. In this case, it is possible to reduce a time until a work start while more surely preventing the workpiece W1 and the workpiece W2 from unexpectedly colliding with each other.

The third determination reference is a reference concerning an end posture of the third operation in the work for the second and subsequent times. The third determination reference is set based on the posture of the workpiece W1 at an end time of the third operation for the first time, that is, the posture of the workpiece W1 at an insertion completion time. Specifically, the robot 1 stores the posture of the workpiece W1 shown in FIG. 6, that is, the angle of the center axis O1 and sets the width of a predetermined angle centering on the stored center axis O1. That is, the robot 1 sets a region indicated by hatching in FIG. 6. In the third operation for the second time, when the center axis O1 of the workpiece W1 enters a region indicated by hatching in FIG. 8, the robot 1 determines that the third operation is completed.

The third determination reference is not limited to be set based on the posture of the workpiece W1 at the end time of the third operation for the first time and may be set based on the posture of the workpiece W1 at an end time of the fourth operation for the first time.

In this way, the determination reference includes the third determination reference concerning the end posture of the third operation. Consequently, in the third operation for the next and subsequent times, it is possible to set end postures to more proper postures.

The third determination reference is set based on the posture of the workpiece W1, which is the first target object, at the insertion completion time in the work for the first time, which is the first step. Consequently, it is possible to perform the work for the second time taking into account the work result for the first time. Accordingly, it is possible to smoothly perform an operation after the operation is switched. As a result, it is possible to improve accuracy of the work and reduce a work time.

The fourth determination reference is a reference concerning an end position of the fourth operation in the work for the second and subsequent times. The fourth determination reference is set based on an end position P4 of the workpiece W1 at an end time of the fourth operation for the first time. Specifically, the robot 1 stores the end position P4 of the control point CP' of the workpiece W1 shown in FIG. 7 and sets an end position P4' where a moving distance in the fifth operation for the second time is smaller than a moving distance in the fifth operation for the first time. That is, the robot 1 sets any position between the end position P4 of the fourth operation for the first time and an end position of the fifth operation for the first time as the fourth determination reference. When ending the fourth operation for the second time, the robot 1 determines whether the control point CP' has moved to the end position P4'. This determination reference is the third determination reference.

In this way, the determination reference includes the fourth determination reference concerning the end position of the fourth operation. Consequently, it is possible to set end postures to more proper postures in the fourth operation for the next and subsequent times.

The fourth determination reference is set based on the position of the workpiece W1, which is the first target object, at the end time of the fourth operation in the first step. Consequently, it is possible to perform the work for the second time taking into account the work result for the first time. Accordingly, it is possible to smoothly perform an operation after the operation is switched. As a result, it is possible to improve accuracy of the work and reduce a work time. It is possible to reduce a moving distance in the fifth operation and achieve a reduction in the work time.

Step S112 for setting such a determination reference, that is, calculating the determination reference and storing the determination reference in the storing section 3C is the second step.

Subsequently, in step S113, the robot 1 determines whether a program is completed. That is, the robot 1 determines whether the assembly work explained above has been executed a predetermined number of times. When determining in step S113 that the program is not completed, the robot 1 returns to step S101 and repeats the subsequent steps.

In this way, in this embodiment, the robot 1 sets a determination reference used at a work time for the second time based on the work result for the first time. Subsequently, the robot 1 sets a determination reference for an n+1-th time based on a work result for an n-th time (n is a positive integer), for example, sets a determination reference used at a worktime for the third time based on a work result for the second time. With such a configuration, even if a work environment changes every time the number of times of work increases, a determination reference can be set again according to an immediately preceding work result. Accordingly, it is possible to adjust switching timing for an operation as appropriate according to the change of the work environment and realize accurate and quick work.

In the above explanation, the robot 1 is configured to set the determination reference for the n+1-th time based on the work result for the n-th time. However, in the present disclosure, the robot 1 is not limited to this. The robot 1 may be configured to set a determination reference for an m+1-th time based on work results for the first time to an m-th time (m is a positive integer). That is, the robot 1 may perform the assembly work a plurality of times in the first step and set the determination reference based on a result of the work. In this case, there are patterns 1 to 3 explained below.

In the pattern 1, for example, when the first determination reference concerning the start position of the first operation is set, a position obtained by adding a predetermined offset amount to an average of work start positions for the first time to the m-th time is set as the first determination reference. Consequently, it is possible to set the first determination reference considering a tendency of the start position of the first operation performed to that point.

In the pattern 2, for example, when the third determination reference concerning an end posture of the third operation is set, an average posture of end postures of the third operation for the first time to the m-th time is set as the third determination reference. Consequently, it is possible to set the third determination reference considering a tendency of end postures of the third operation performed to that point.

In the third pattern, for example, when the fourth determination reference concerning the end position of the fourth operation is set, a position obtained by adding a predetermined offset amount to an average of end postures of the fourth operation for the first time to the m-th time is set as the fourth determination reference. Consequently, it is possible to set the fourth determination reference considering the tendency of the end positions of the fourth operation to that point.

In the patterns 1 to 3, the determination reference may be set based on most recent work results for a plurality of times among the work results for the first time to the m-th time. Consequently, when a value of m is relatively large, it is possible to set a more accurate determination reference avoiding using excessively old past data.

In this way, the assembly work may be performed a plurality of times in the first step. The determination reference may be set based on information obtained by the assembly work for a plurality of times. Consequently, it is possible to set the determination reference considering a tendency of work content in the past. Accordingly, it is possible to perform more accurate and quick work.

FIG. 10 is a graph in which start positions in the past are plotted for each of numbers of times of work when the first determination reference concerning the start position of the first operation is set. In FIG. 10, the vertical axis indicates a work start position and the horizontal axis indicates the number of times of work. As shown in FIG. 10, the work start position relatively greatly changes when the number of times of work is eighty or larger. Therefore, it is likely that some deficiency has occurred. Data in the past is displayed to inform the data to the operator. Consequently, the operator can perform work for clarifying a cause.

In this way, when an average of information obtained in the plurality of times of the assembly work exceeds a predetermined range, the excess of the predetermined range is informed to the operator. Consequently, the operator can perform work for clarifying a cause.

In FIG. 10, the lateral axis indicates the number of times of work. However, in the present disclosure, the horizontal axis is not limited to this and may indicate a date. In this case, for example, an average of work results of the day is plotted.

Even if such data is not presented, the determination reference may be set without taking into account a work result in which a change amount exceeds a predetermined amount.

As explained above, the control method for the robot according to the present disclosure is a control method for the robot 1 including the robot arm 10, the control method including a first step in which the robot arm 10 grips the workpiece W1, which is a first target object, and performs work for assembling the workpiece W1 and the workpiece W2, which is a second target object, while changing a position or a posture of the workpiece W1, and a second step for setting, based on information concerning the position or the posture of the workpiece W1 during the work in the first step, a determination reference serving as a reference for starting the change of the position or the posture of the workpiece W1 or ending the change of the position or the posture of the workpiece W1. Consequently, even if a work environment changes every time the number of times of work increases, a determination reference can be set again according to an immediately preceding work result. Accordingly, it is possible to adjust switching timing for an operation as appropriate according to the change of the work environment and realize accurate and quick work.

The assembly work is work for inserting the workpiece W1, which is a first target object, into the insertion hole 200 provided in the workpiece W2, which is a second target object, and includes a first operation for bringing the workpiece W1 into contact with an edge portion of the insertion hole 200 of the workpiece W2 in an inclined state in which the workpiece W1 is inclined with respect to the insertion hole 200, a second operation for moving the workpiece W1 to the center axis O2 side of the insertion hole 200 while maintaining the inclined state, a third operation for changing an inclination angle of the workpiece W1, and a fourth operation for pushing the workpiece W1 in the center axis O2 direction of the insertion hole 200. When such complicated work is performed, it is necessary to accurately set switching timings of the operations. Therefore, the control method according to the present disclosure is particularly effective.

Other Configuration Examples of a Robot System

Figure 11:
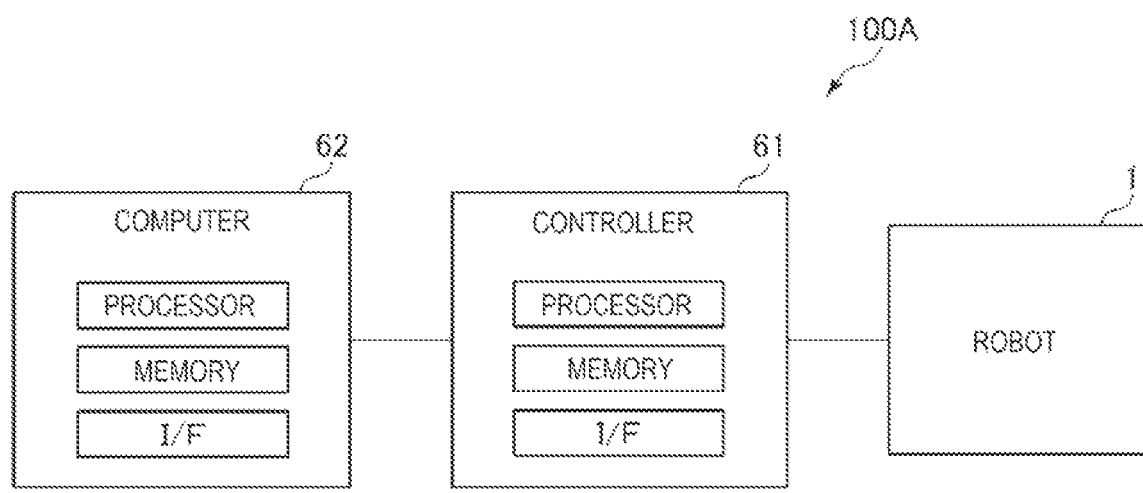
FIG. 11 is a block diagram for explaining the robot system centering on hardware.

FIG. 11 is a block diagram for explaining a robot system centering on hardware.

FIG. 11 shows an overall configuration of a robot system 100A in which the robot 1, a controller 61, and a computer 62 are coupled. Control of the robot 1 may be executed by reading out a command present in a memory with a processor present in the controller 61 or may be executed via the controller 61 by reading out the command present in the memory with a processor present in the computer 62.

Therefore, one or both of the controller 61 and the computer 62 can be grasped as a "control device".

Modification 1

Figure 12:
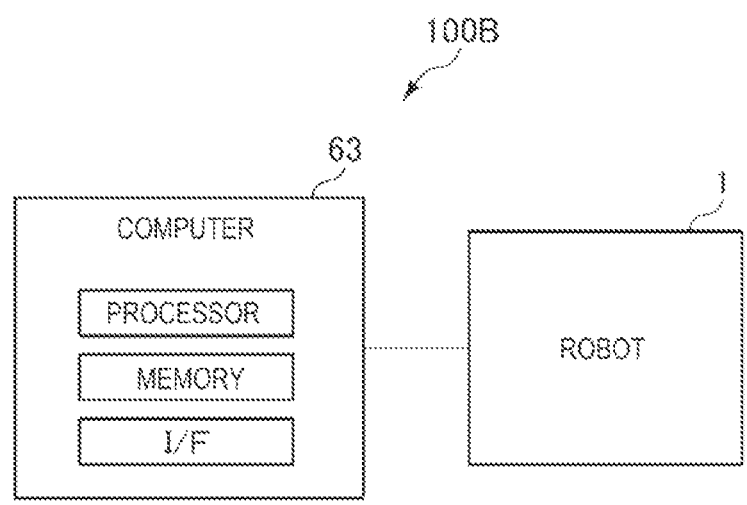
FIG. 12 is a block diagram showing a modification 1 centering on the hardware of the robot system.

FIG. 12 is a block diagram showing a modification 1 centering on hardware of a robot system.

FIG. 12 shows an overall configuration of a robot system 100B in which a computer 63 is directly coupled to the robot 1. Control of the robot 1 is directly executed by reading out a command present in a memory with a processor present in the computer 63.

Therefore, the computer 63 can be grasped as a "control device".

Modification 2

Figure 13:
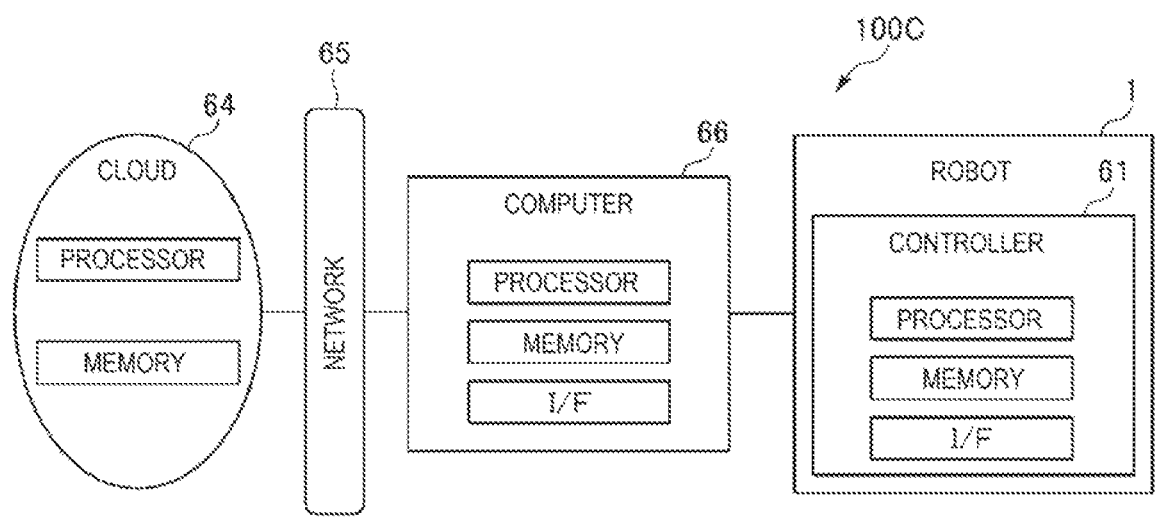
FIG. 13 is a block diagram showing a modification 2 centering on the hardware of the robot system.

FIG. 13 is a block diagram showing a modification 2 centering on hardware of a robot system.

FIG. 13 shows an overall configuration of a robot system 100C in which the robot 1 incorporating the controller 61 and a computer 66 are coupled and the computer 66 is coupled to Cloud 64 via a network 65 such as a LAN. Control of the robot 1 may be executed by reading out a command present in a memory with a processor present in the computer 66 or may be executed by reading out a command present in the memory via the computer 66 with a processor present on the Cloud 64.

Therefore, at least one, any two, or three of the controller 61, the computer 66, and the Cloud 64 can be grasped as a "control device".

The control method for the robot according to the present disclosure is explained above with reference to the embodiment shown in the figures. However, the present disclosure is not limited to this. The sections configuring the robot system can be replaced with sections having any configurations that can exert the same functions. Any components may be added.

What is claimed is:

1. A control method for a robot including a robot arm, the control method for causing a processor to execute a process, the control method comprising executing on the processor the steps of:

gripping a first target object by the robot arm in a first state in which the first target object is inclined with respect to a reference direction, a control point being set at a midpoint of a distal end of the first target object, a center axis of the first target object passing through the control point;

performing, after the gripping of the first target object, first movement to move the first object to a first position at which the first target object is in the first state, the control point of the first target object at the first position being spaced apart from a second target object along the reference direction, the second target object having an insertion hole extending along the reference direction;

performing second movement with first force control to move the first target object along the reference direction from the first position toward a first edge of the insertion hole of the second target object;

stopping the second movement at a second position when the processor determines that a part of a bottom surface of the first target object contacts the first edge of the insertion hole of the second target object based on the first force control, the control point at the second position being located inside of the insertion hole;

performing, after the stopping of the second movement, third movement with second force control to move the first target object toward a second edge of the insertion hole opposite to the first edge while an inclined state of the first target object is maintained;

stopping the third movement at a third position when the processor determines that one side surface of the first target object contacts the second edge based on the second force control;

performing, after the stopping of the third movement, an insertion operation in which the first target object is inserted into the insertion hole of the second target object by aligning the center axis of the first target object with a center axis of the insertion hole;

setting a first determination reference that is a reference distance between the control point at the first position and the control point at the second position; and performing a repeat operation in which the gripping of the first object, the performing of the first movement, the performing of the second movement, the stopping of the second movement, the performing of the third movement, the stopping of the third movement, and the performing of the insertion operation are repeated, wherein, in the performing of the first movement of the performing of the repeat operation, the processor is configured to move the first target object to a fourth position under a condition of the first determination reference in which a distance between the control point at the fourth position and the control point at the second position is less than the reference distance.

2. The control method for the robot according to claim 1, wherein, when the second movement is stopped at the second position, the first target is in the inclined state in which the first target object is inclined with respect to the insertion hole of the second target object, and during the performing of the insertion operation, the processor is configured to push the first target object in a direction along the center axis of the insertion hole so that the first target object is inserted into the insertion hole of the second target object after the center axis of the first target object is aligned with the center axis of the second target object.

3. The control method for the robot according to claim 2, wherein the processor is further configured to set a second determination reference concerning an end posture when the inclination angle of the first target object is changed.

4. The control method for the robot according to claim 3, wherein the second determination reference is set based on a posture of the first target object at a completion time of the insertion operation.

5. The control method for the robot according to claim 2, wherein the processor is further configured to set a third determination reference concerning an end position when the first target object is pushed in the direction along the center axis of the insertion hole.

6. The control method for the robot according to claim 5, wherein the third determination reference is set based on a position of the first target object at an end time of the insertion operation.

7. The control method for the robot according to claim 1, wherein, when an average of information obtained in the repeat operation exceeds a predetermined range, the excess of the predetermined range is informed.

* * * * *